US012214926B2

(12) United States Patent
Bardini

(10) Patent No.: US 12,214,926 B2
(45) Date of Patent: Feb. 4, 2025

(54) LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. Labellers S.P.A., Porto Mantovano (IT)

( * ) Notice: Subject to any disclaimer, the term of this patent is extended or adjusted under 35 U.S.C. 154(b) by 88 days.

(21) Appl. No.: 17/791,954

(22) PCT Filed: Dec. 29, 2020

(86) PCT No.: PCT/EP2020/087966
§ 371 (c)(1),
(2) Date: Jul. 11, 2022

(87) PCT Pub. No.: WO2021/144137
PCT Pub. Date: Jul. 22, 2021

(65) Prior Publication Data

US 2023/0043141 A1 Feb. 9, 2023

(30) Foreign Application Priority Data

Jan. 13, 2020 (IT) ........................ 102020000000400

(51) Int. Cl.
*B65C 9/18* (2006.01)
*B65C 9/04* (2006.01)

(52) U.S. Cl.
CPC .............. *B65C 9/1819* (2013.01); *B65C 9/04* (2013.01); *B65C 9/1892* (2013.01); *B65C 9/1807* (2013.01)

(58) Field of Classification Search
CPC .................................................... B65C 9/1819
See application file for complete search history.

(56) References Cited

U.S. PATENT DOCUMENTS 2,717,711 A * 9/1955 Sydney ..................... B65C 9/08 156/DIG. 28
3,970,499 A * 7/1976 Bommes ................... B65C 9/16 156/227

(Continued)

FOREIGN PATENT DOCUMENTS

EP 0145640 A2 6/1985
EP 3446993 A1 2/2019

(Continued)

OTHER PUBLICATIONS

European Patent Office (ISA/EP), International Search Report, International Application No. PCT/EP2020/087966, 3 pages, Mar. 18, 2021.

(Continued)

*Primary Examiner* — Philip C Tucker
*Assistant Examiner* — John Blades
(74) *Attorney, Agent, or Firm* — THOMPSON HINE LLP

(57) ABSTRACT

A labeling machine, which includes a conveyor of containers to be labeled along an advancement path and at least one labeling unit arranged along the advancement path and provided with a respective transfer drum that can move in rotation about its own axis, with respect to a supporting base, and which is adapted to receive, in adhesion to its lateral surface, from a feeder unit, labels to be applied to the containers, at a feeding station, and to transfer the labels received at the feeding station to respective containers that arrive from the conveyor at a transfer station which is angularly spaced apart from the feeding station about the axis of the transfer drum; at least one portion of a sector of the lateral surface of the transfer drum is rotatably movable, with respect to the remaining part of the transfer drum.

11 Claims, 12 Drawing Sheets

(56) References Cited

U.S. PATENT DOCUMENTS

| | | | |
|---|---|---|---|
| 4,242,167 | A | 12/1980 | Hoffmann |
| 4,592,796 | A | 6/1986 | Schlacht |

FOREIGN PATENT DOCUMENTS

| | | | |
|---|---|---|---|
| JP | S 5564034 | A | 5/1980 |
| JP | S 59174439 | A | 10/1984 |
| JP | 2009220877 | A | 10/2009 |

OTHER PUBLICATIONS

European Patent Office (ISA/EP), Written Opinion of the International Searching Authority, International Application No. PCT/EP2020/087966, 8 pages, Mar. 18, 2021.

* cited by examiner

LABELING MACHINE

The present invention relates to a labeling machine.

Labeling machines are known which make it possible to apply to containers labels which are provided, via cutting, by a labeling ribbon which is unwound from a spool and which bears a succession of labels printed thereon.

The labeling ribbon can have, on the face thereof that is intended to make contact with the containers, a layer of preapplied adhesive on the entire surface thereof or at portions located at the head and tail ends of each label, or it can be without preapplied adhesive and, in such case, the labeling machine is provided with a gluing unit, usually constituted by an adhesive applicator roller, which spreads the adhesive onto the labels in line at the moment of use i.e. just before they are applied to the containers.

In general, labeling machines have a conveyor for the containers, which is typically constituted by a rotating carousel that is peripherally provided with supporting pans to support the individual containers, which make the containers rotate about their own axes, and they have at least one labeling unit, arranged around the peripheral region of the rotating carousel, which is provided with a transfer drum which is designed to bring the labels to adhere to the containers arriving from the rotating carousel.

In some types of labeling machines, upstream of the transfer drum there are means for cutting which cut the labeling ribbon between one label and the next, so that pre-cut labels can arrive at the transfer drum, while in other types of labeling machines, the transfer drum receives the labeling ribbon from a feeder unit and is provided with blades that cut the labeling ribbon at the separation region between two consecutive labels.

In any case, the transfer drum is provided on its lateral surface with openings that are in communication with suction means in order to ensure the individual labels separated after cutting are held in adherence to its lateral surface.

In particular, along the lateral surface of the transfer drum there are typically one or more sectors or divisions which are designed, in each instance, to receive a corresponding label to be transferred to the corresponding container supported by the rotating carousel.

Normally, on the lateral surface of the transfer drum, between one sector and the next, there are runners or pads, on which the head or tail ends of the individual labels rest and which protrude, with respect to the remaining part of the lateral surface, so as to ensure the successful contact of the single label with the adhesive applicator roller, if present, or, in any case, with the corresponding container, originating from the rotating carousel, for which the label is destined, exclusively at the head and tail ends of that label.

In order to allow labeling machines to operate at high production speeds, it is necessary to have, around the rotating carousel, two or more labeling units which work "in alternation" or "in tandem", i.e. with a first labeling unit applying labels to every first container arriving from the rotating carousel and a second labeling unit applying labels to every second container, immediately after the first, arriving from the rotating carousel, so that each labeling unit present in the labeling machine can work at half the speed at which a single labeling unit would have to work.

With this configuration it is not possible, however, to label containers with a diameter greater than a determined limit diameter, because the containers that are not to be labeled by a labeling unit would end up touching, on the transfer drum of that labeling unit, the label that is not destined for it.

In order to overcome this problem, transfer drums have been made with sectors defined on them that extend circumferentially for a greater length than the length of the individual labels, so as to space the labels received from the transfer drum further apart from each other, and with a shape that is no longer cylindrical, as normally occurs, but which has an eccentricity with respect to the axis of the transfer drum, which is achieved using elements which are similar to the above mentioned runners or pads and are located only at the region that, in each instance, is occupied by the front part of the label, so that the remaining part of the label can remain spaced apart from the container for which it is not intended, which can therefore pass in front of the transfer drum without touching the label, and the label can instead make contact with the container to be labeled with the front part thereof.

With the configuration just described, if the transfer drum is provided with cutting blades and is, therefore, fed with the as-yet-uncut labeling ribbon, the ribbon will end up having to slip against the lateral surface of the transfer drum, given that the sectors or divisions on it are, as mentioned, much longer than the label to be cut.

Furthermore, since in this case the lateral surface of the transfer drum against which the labeling ribbon slips is not cylindrical and uniform but is affected by dimensional variations in a radial direction with respect to the axis of the transfer drum, the labeling ribbon can easily become overheated and deformed, its position in terms of height can become distorted and, in the extreme case, it can even break away from the lateral surface of the transfer drum, with the consequence that the labels taken from it after cutting may be applied incorrectly, or may even not be applied at all, to the corresponding containers.

The aim of the present invention is to provide a labeling machine that is capable of improving the known art in one or more of the above mentioned aspects.

Within this aim, an object of the invention is to provide a labeling machine in which the slipping of the labeling ribbon on the transfer drums of the labeling units that work in tandem can occur on a surface that is free from dimensional variations in a radial direction with respect to the axis of that transfer drum.

Another object of the invention is to provide a labeling machine with transfer drums that can be made with a greater number of sectors with respect to the known art so as to reduce the space between one label and the next in front of the containers.

Another object of the present invention is to provide a labeling machine that makes it possible to ensure the correct positioning of the label on the transfer drum, to the advantage of the quality of the final package.

Another object of the present invention is to provide a labeling machine that is capable of offering wide-ranging guarantees of reliability and safety in operation.

A further object of the present invention is to overcome the drawbacks of the background art in an alternative manner to any existing solutions.

Another object of the invention is to provide a labeling machine that is easily and practically implemented and which is competitive from a purely economic viewpoint as well.

This aim and these and other objects which will become better apparent hereinafter are achieved by a labeling machine according to claim 1, optionally provided with one or more of the characteristics of the dependent claims.

Further characteristics and advantages of the invention will become better apparent from the description of preferred, but not exclusive, embodiments of the labeling machine according to the invention, which are illustrated for the purposes of non-limiting example in the accompanying drawings wherein.

Figure 1:
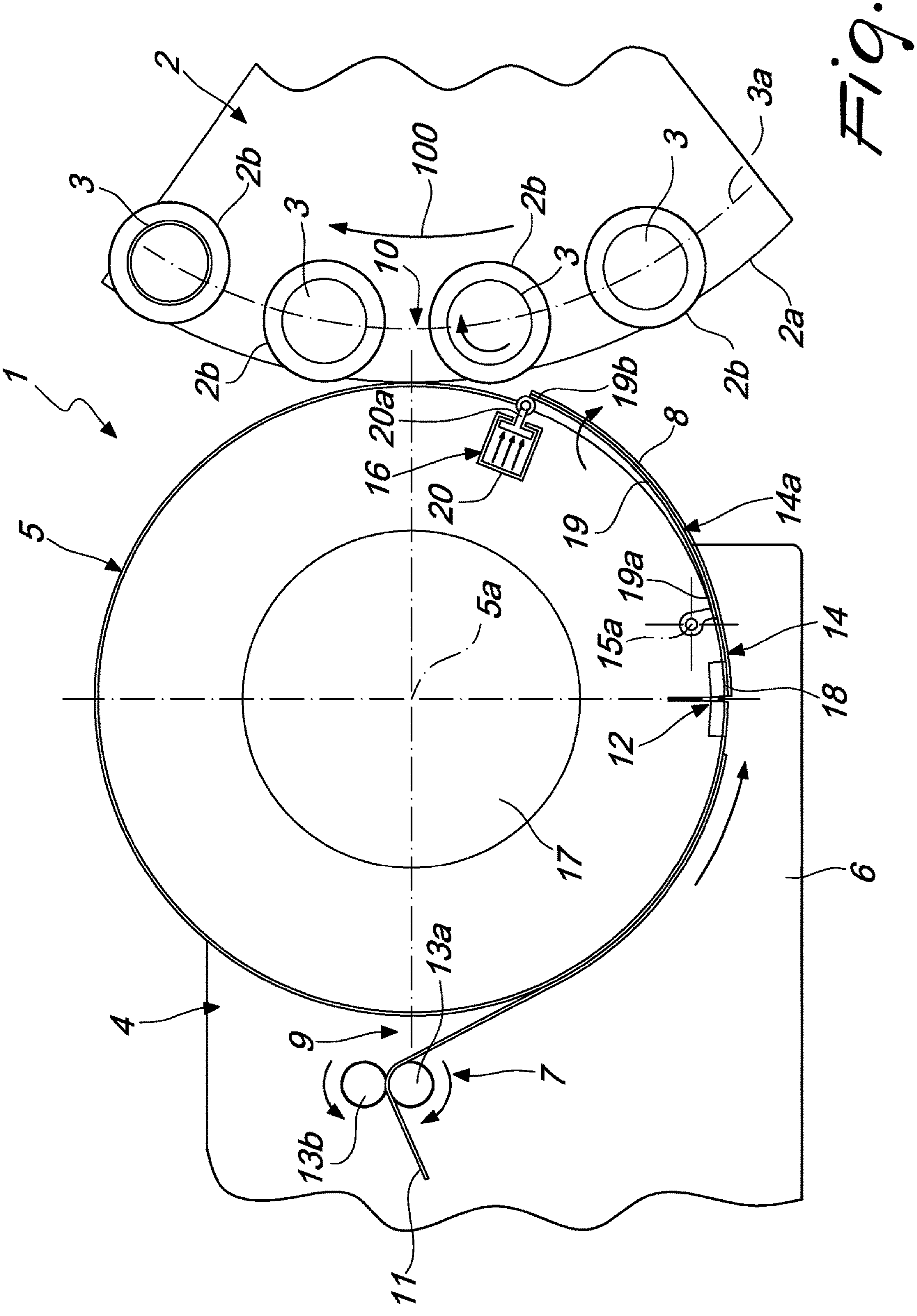
FIG. 1 is a schematic and partially cutaway plan view from above of the machine according to the invention in a step of feeding a label to a transfer drum.

With reference to the figures, the labeling machine according to the invention, generally designated by the reference numeral 1, comprises a conveyor 2 of the containers 3 to be labeled along an advancement path 3*a*.

Such conveyor 2 is, for example, constituted by a rotating carousel 2*a* which rotates in the direction indicated by the arrow 100, which has, on its peripheral region, rotating pans 2*b* each of which supports an individual container 3, making it rotate about its own axis.

The machine is, furthermore, provided with at least one labeling unit 4 which is arranged along the advancement path 3*a* of the containers 3.

The (or each) labeling unit 4 has a respective transfer drum 5, which can move by rotation about its own axis 5*a* with respect to a supporting base 6.

In particular, the transfer drum 5 of the (or each) labeling unit 4 is designed to receive, in adhesion to its lateral surface, labels 8 from a feeder unit 7, at a feeding station 9, which are to be applied to the containers 3, and to transfer the labels 8 received at the feeding station 9 to respective containers 3 that arrive from the conveyor 2 at a transfer station 10 which is angularly spaced apart from the feeding station 9 about the axis 5*a* of that transfer drum.

It is possible for the feeder unit 7 to be designed to feed the transfer drum 5 with a continuous labeling ribbon 11, which bears in succession the labels 8 to be transferred to the containers 3, and which is taken from a spool 110, while another, reserve spool 111 can be provided, on the same labeling unit 4, ready to supply, in a manner that is known per se, a new labeling ribbon 11 when the spool 110 runs out.

In such case, the transfer drum 5 is, conveniently, provided with means for cutting the labeling ribbon 11 which are constituted by, for example, one or more blades 12 distributed about the perimeter of the transfer drum 5 and supported by that transfer drum, which cut the single labels 8 from the labeling ribbon 11.

Also in this case, the feeder unit 7 can be, for example, provided via a pair of contra-rotating feeding rollers 13*a* and 13*b*.

Figure 8:
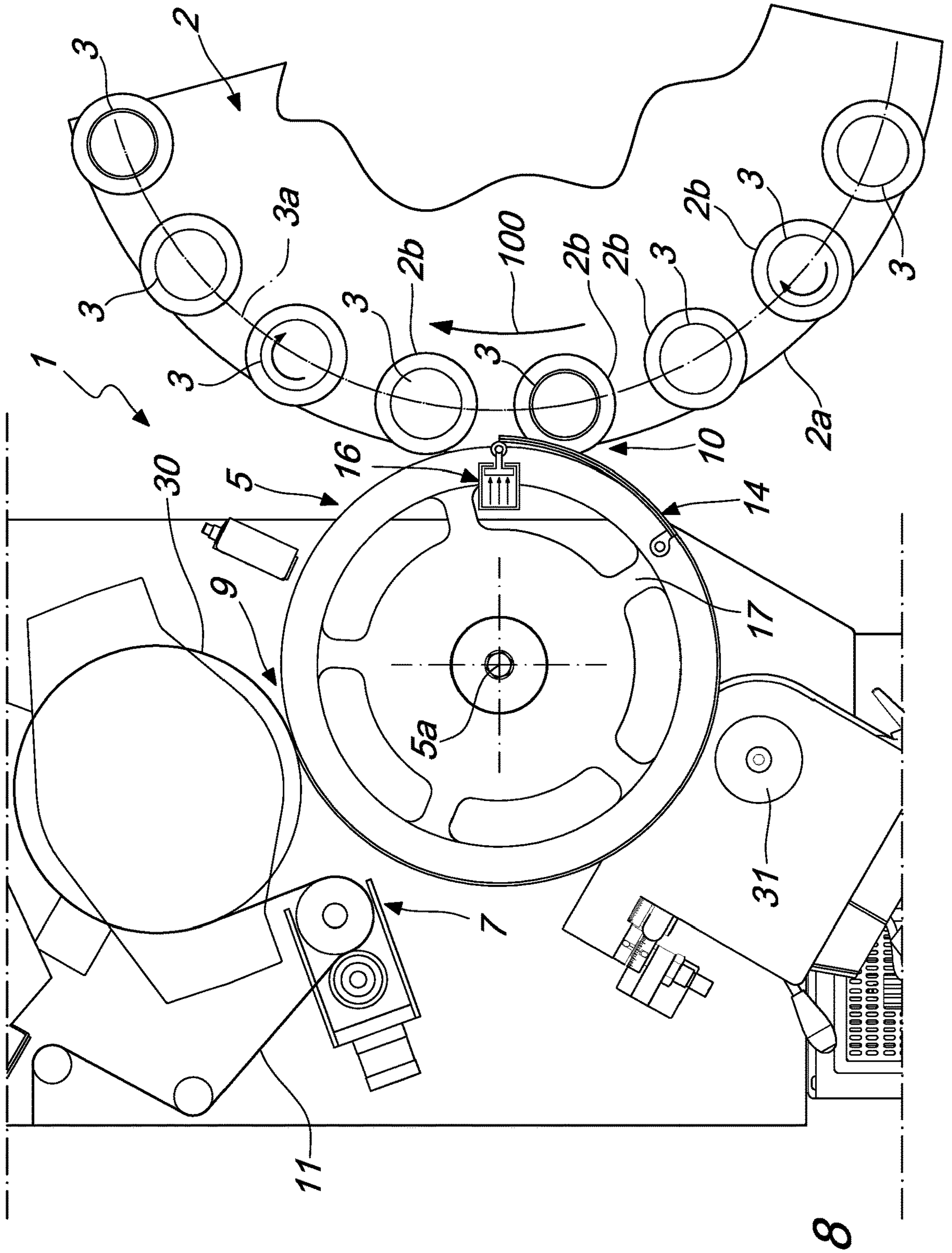
FIG. 8 is a schematic plan view from above of another possible embodiment of the machine according to the invention, with parts shown in cross-section.
Figure 9:
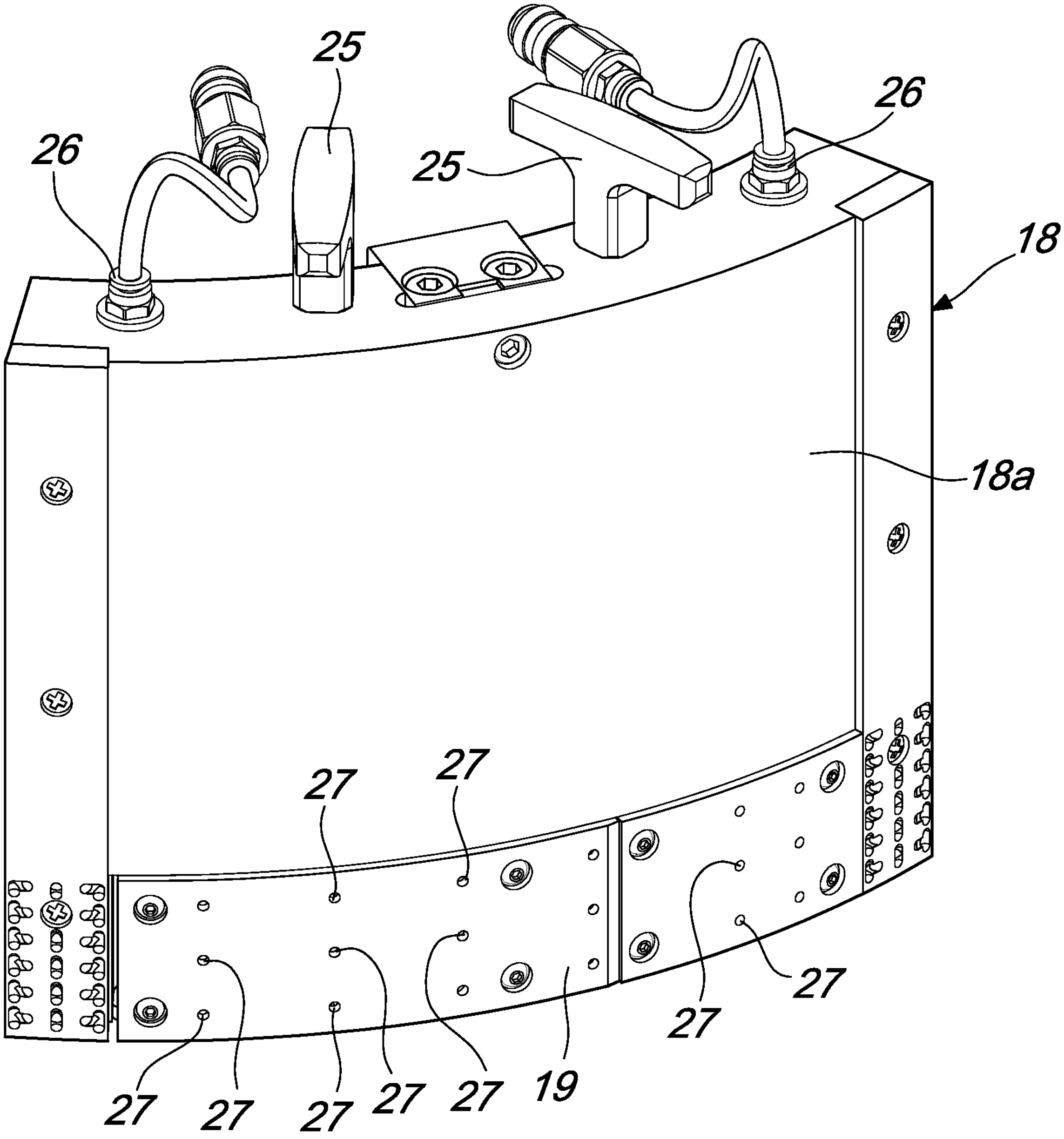
FIG. 9 is a perspective view of an embodiment of a shell-like body which provides a sector of the transfer drum of the machine according to the invention with a portion of the sector shown in a receiving position.
Figure 10:
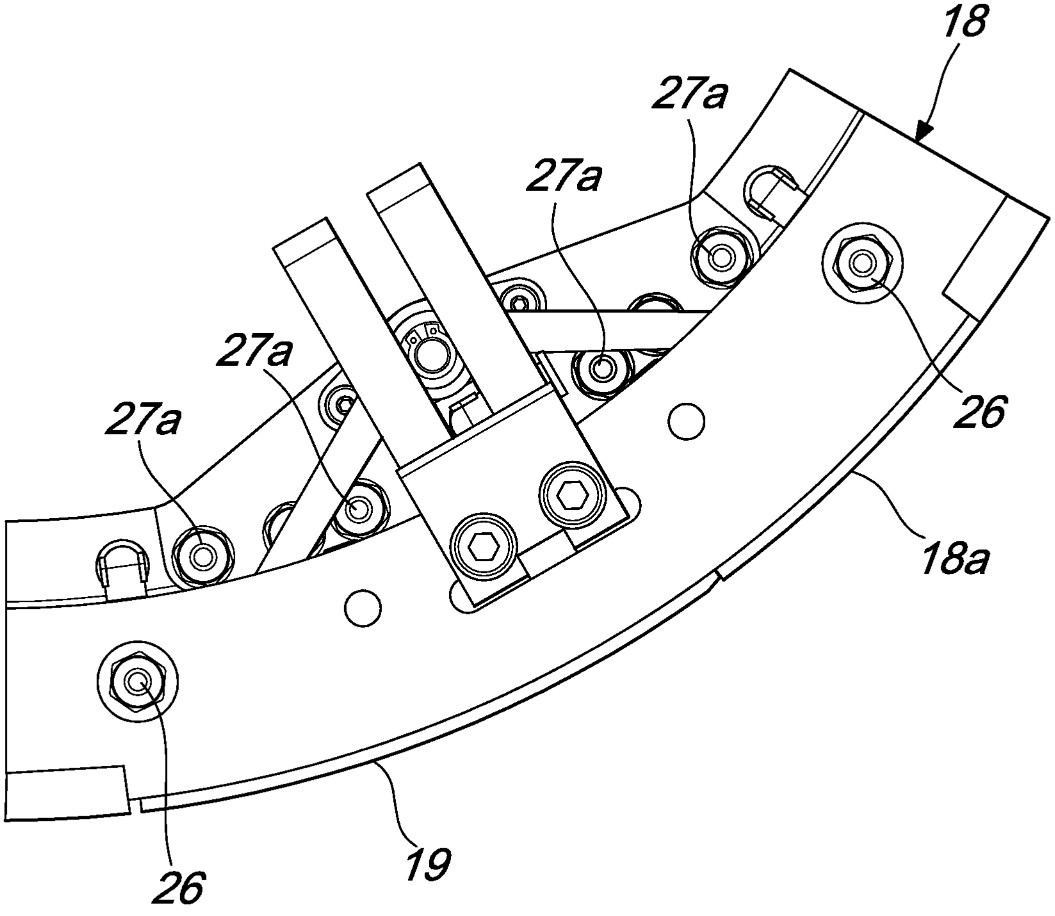
FIG. 10 is a plan view from above, with parts omitted for the sake of simplicity, of the shell-like body in the condition of FIG. 9.
Figure 11:
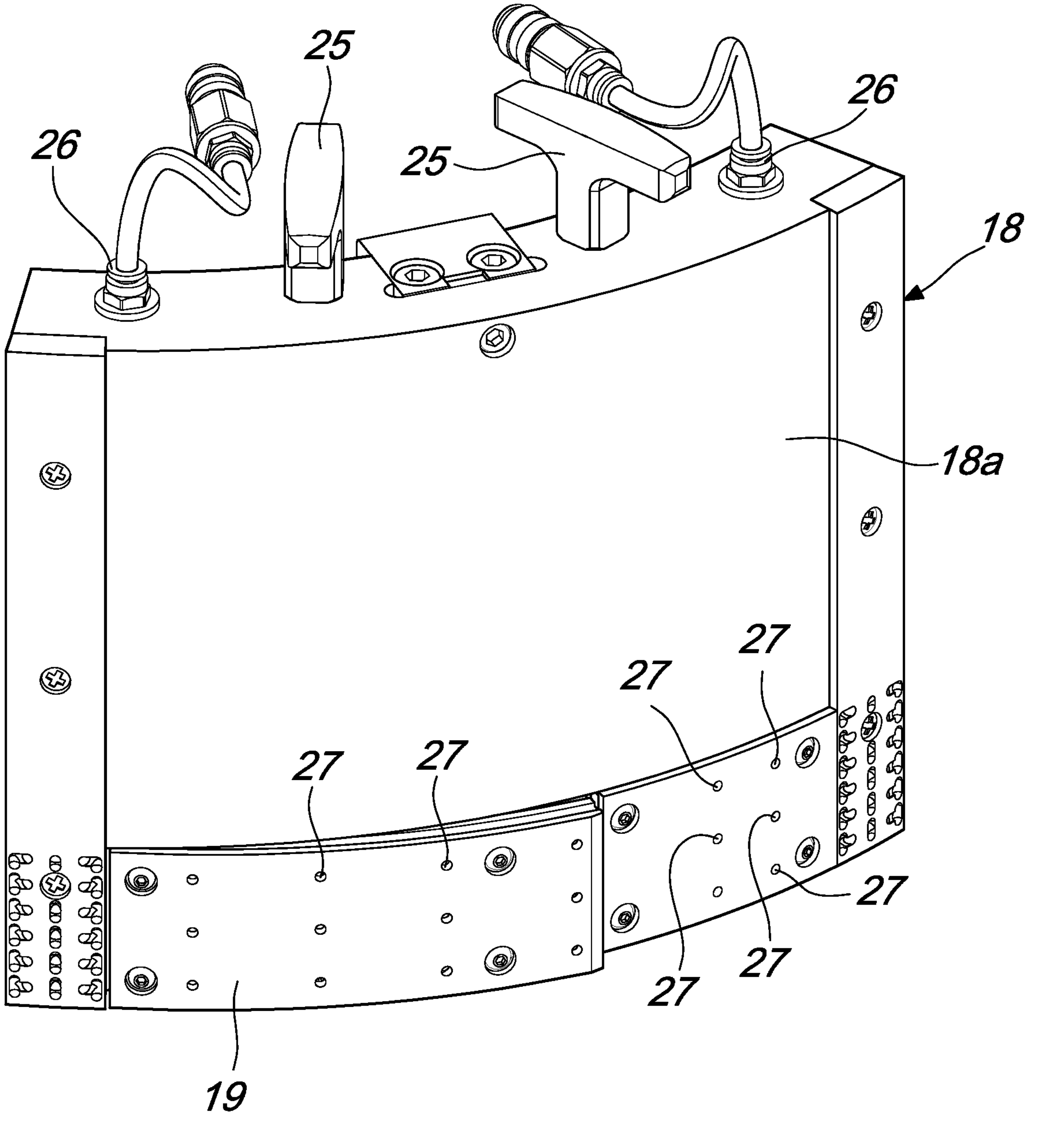
FIG. 11 is a perspective view of the shell-like body of FIG. 9 shown with a portion in a transfer position.
Figure 12:
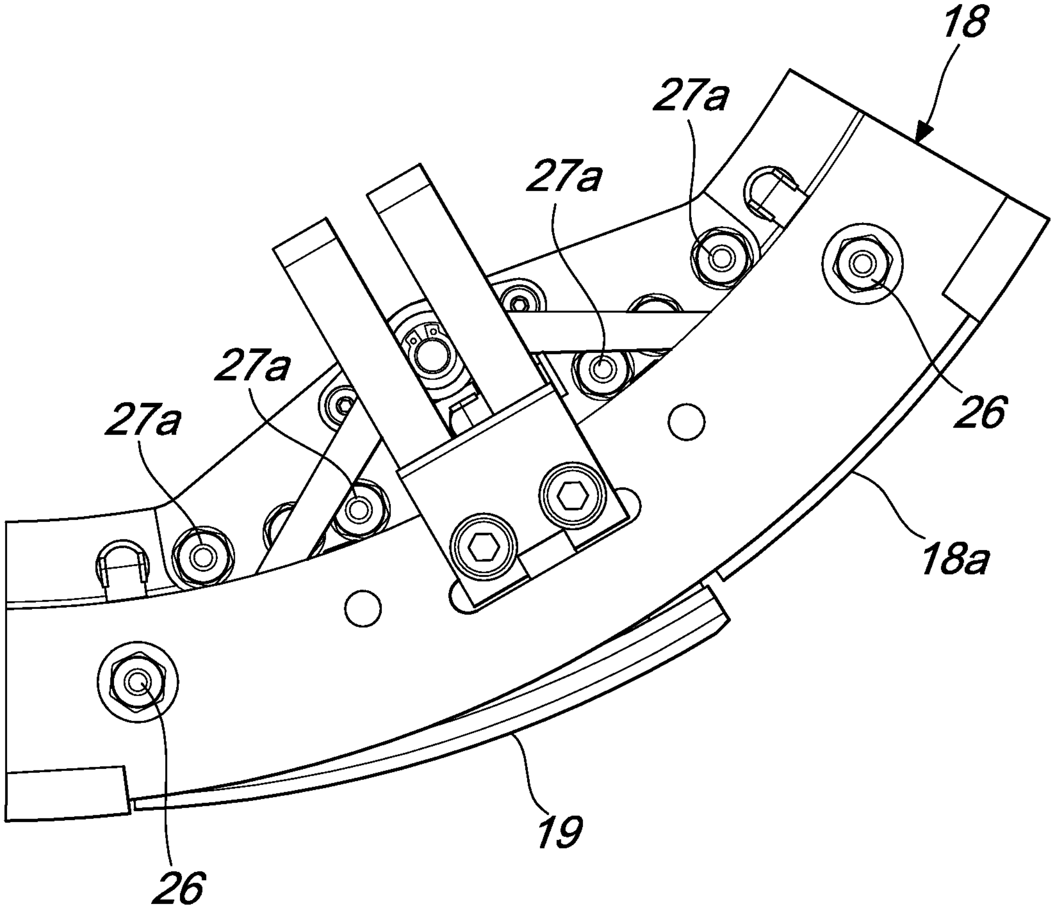
FIG. 12 is a plan view from above, with parts omitted for the sake of simplicity, of the shell-like body in the condition of FIG. 11.

Alternatively, as in the case of the embodiment of the invention shown in FIG. 8, the labeling ribbon 11 can arrive at the transfer drum 5 already cut by a cutting roller 30, interposed between the feeder unit 7 and the transfer drum 5, so that the transfer drum 5 is fed by individual labels 8 separated from the labeling ribbon 11.

The labeling ribbon 11 can be previously provided with portions of preapplied adhesive at the head and at the tail of each individual label 8. Otherwise, as in the embodiment of FIG. 8, the machine can be provided with means of application of the adhesive on the labels 8 which can, for example, comprise an adhesive applicator roller 31, which can be arranged facing the transfer drum 5.

Advantageously, as is usual, in order to keep the labeling ribbon 11 and/or of the labels 8 in adherence to the lateral surface of the transfer drum 5, the transfer drum 5 is provided, on its lateral surface, with openings that are connected to air extraction means, as will also be described below.

On the lateral surface of the transfer drum 5, furthermore, at least one sector 14 is defined which extends along at least one portion of the circumferential extension of the lateral surface of the transfer drum 5 and is designed to accommodate, in each instance, a single label 8 to be transferred to the corresponding container 3.

According to the invention, at least one portion 14*a* of the sector 14 is rotatably movable, with respect to the remaining part of the transfer drum 5, about an oscillation axis 15*a*, which is substantially parallel to and spaced apart from the axis 5*a* of the transfer drum 5, in order to pass from a label receiving position, it which it is arranged at a first radial distance from the axis 5*a* of the transfer drum 5, to a transfer position, in which it is arranged, with at least one part thereof, at a second radial distance from the axis 5*a* of the transfer drum 5, greater than the first distance, and vice versa.

In particular, the rotatably movable portion 14*a* of the sector 14 is in the receiving position, at least when it is passing by the feeding station 9, during the rotation of the transfer drum 5 about its own axis 5*a*, while it is in the transfer position, at least when it is passing, again during rotation of the transfer drum 5 about its own axis 5*a*, by the transfer station 10.

Advantageously, there are actuation means 16 adapted to actuate the transition of the rotatably movable portion 14*a* of the sector 14 between the receiving position and the transfer position.

In particular, the actuation means 16 are, conveniently, adapted to bring the rotatably movable portion 14*a* of the sector 14 from the receiving position to the transfer position, before the portion 14 reaches the transfer station 10 in its movement from the feeding station 9 to the transfer station 10, during the rotation of the transfer drum 5, and they are, advantageously, adapted to bring the rotatably movable portion 14*a* of the sector 14 from the transfer position to the receiving position, before the portion 14*a* reaches the feeding station 9 in its movement from the transfer station 10 to the feeding station 9, during the rotation of the transfer drum 5.

In more detail, the transfer drum 5 comprises a base structure 17, mounted so that it can rotate on the supporting base 6, which supports at least one shell-like body 18 which defines at least one part of the sector 14, while the rotatably movable portion 14*a* of the sector 14 is provided by an oscillating body 19, which is hinged with respect to the base structure 17 about the oscillation axis 15*a*, conveniently at a region of the base structure 17 that is proximate to the lateral surface of the transfer drum 5.

Conveniently, the oscillating body 19 extends for at least one portion of the circumferential extension of the sector 14 and has an external surface shaped so as to correspond to the remaining part of the lateral surface of the transfer drum 5 and, in particular, of the sector 14.

Advantageously, the oscillating body 19 is arranged, when it is in the receiving position, substantially aligned, with its external surface, to the remaining part of the lateral surface of the transfer drum 5 i.e. of the sector 14, so that there are no points of discontinuity on the lateral surface of the transfer drum 5.

Advantageously, the oscillating body 19 is hinged with respect to the base structure 17 substantially at an end 19*a* of its extension that is arranged at the rear with respect to the direction of rotation of the transfer drum 5, so as to obtain the capacity for angular movement, about the oscillation axis 15*a*, of its opposite end 19*b*, located at the front, with respect to the direction of rotation of the transfer drum 5, on which the head end of the labels 8 substantially comes to be positioned, toward or away from the axis 5*a* of the transfer drum 5 and, more particularly, toward or away from the remaining part of the lateral surface of the transfer drum 5.

Optionally, the transfer drum 5 can be provided with multiple sectors 14 distributed along the circumferential extension of the lateral surface of the transfer drum 5, each one of which is designed to receive and accommodate, in each instance, a single label 8 to be transferred to the corresponding containers 3. In this case, each sector 14 has at least one respective portion 14*a* that is rotatably movable with respect to the remaining part of the transfer drum 5, about a respective oscillation axis 15*a*, between the receiving position and the transfer position, and conveniently implemented by a respective oscillating body 19.

FIGS. 9-12 show an embodiment of a shell-like body 18 that makes it possible to provide a sector 14 of the transfer drum 5.

In particular, with reference to such embodiment, each shell-like body 18 has a convex external surface 18*a*, which defines, with the external surface 18*a* of the other shell-like bodies 18 of the transfer drum 5, the lateral surface of the transfer drum.

Again with reference to the embodiment of FIGS. 9-12, each shell-like body 18 is, conveniently, provided with means for fixing to the base structure 17 of the transfer drum 5, which are provided, advantageously, by screws, which can be maneuvered, for example, using wing nuts 25 or other, similar elements that are easily accessible for a convenient mounting and dismounting of the shell-like body 18 onto and from the transfer drum 5.

Conveniently, each shell-like body 18 is further provided, at least in the region of its external surface 18*a* that is intended to receive the labels 8, with intake ports 27, connected to connectors 27*a*, defined on the end wall of the shell-like body 18, which constitutes the contact surface of the shell-like body 18 with the base structure 17 of the transfer drum 5, in order to allow the connection of the intake ports 27 to a vacuum source, not shown, so as to ensure, in a manner that is known per se, that the labels 8 are maintained in adhesion on its outer surface 18*a*.

In the embodiment of FIGS. 9-12, an oscillating body 19 is hinged to the shell-like body 18 and defines a part of the region of the external surface of the shell-like body 18 that is destined to receive the labels 8.

Figure 2:
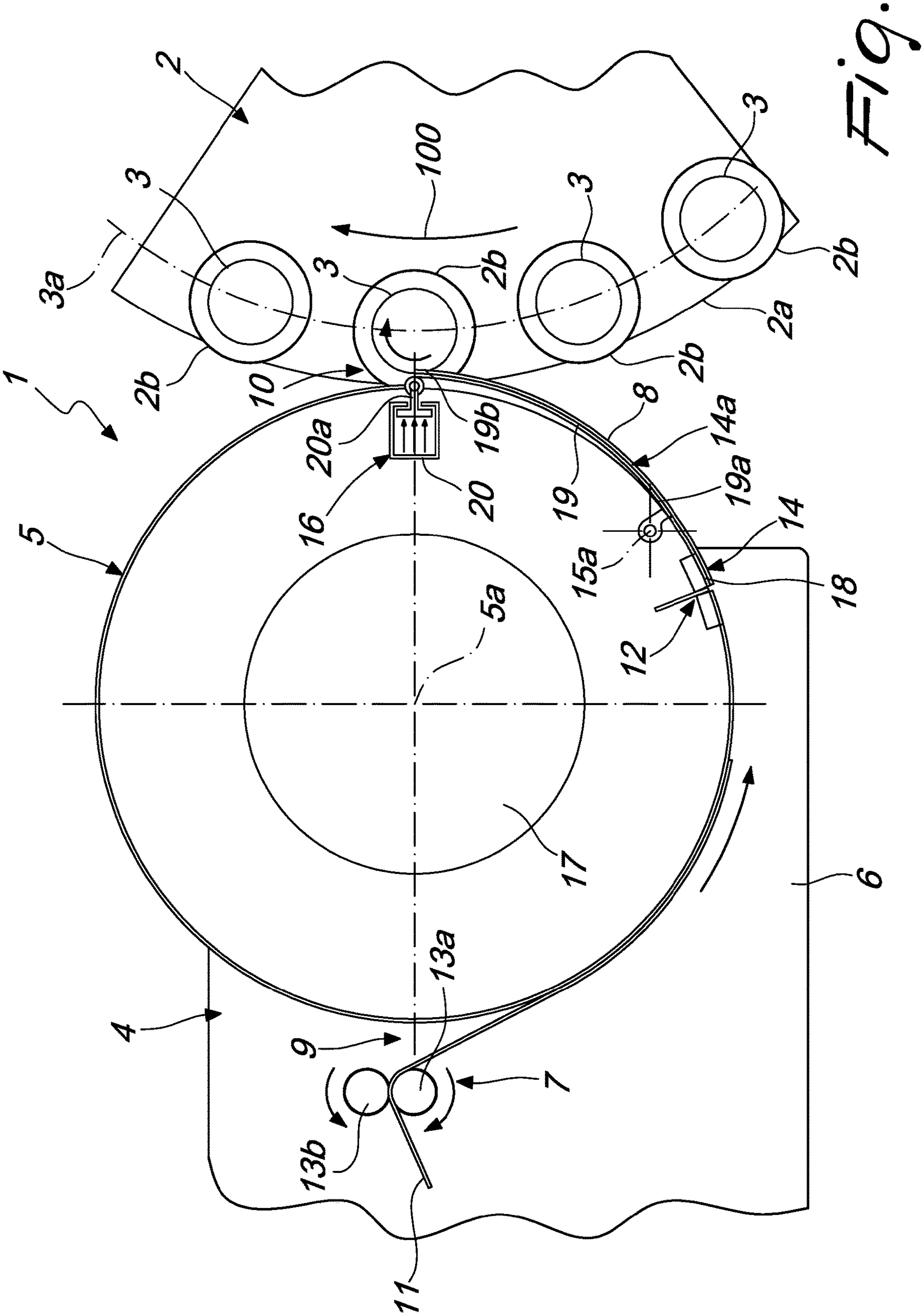
FIG. 2 is a schematic and partially cutaway plan view from above of the machine according to the invention, showing an initial step of application of a label by the transfer drum of FIG. 1 to a corresponding container.
Figure 3:
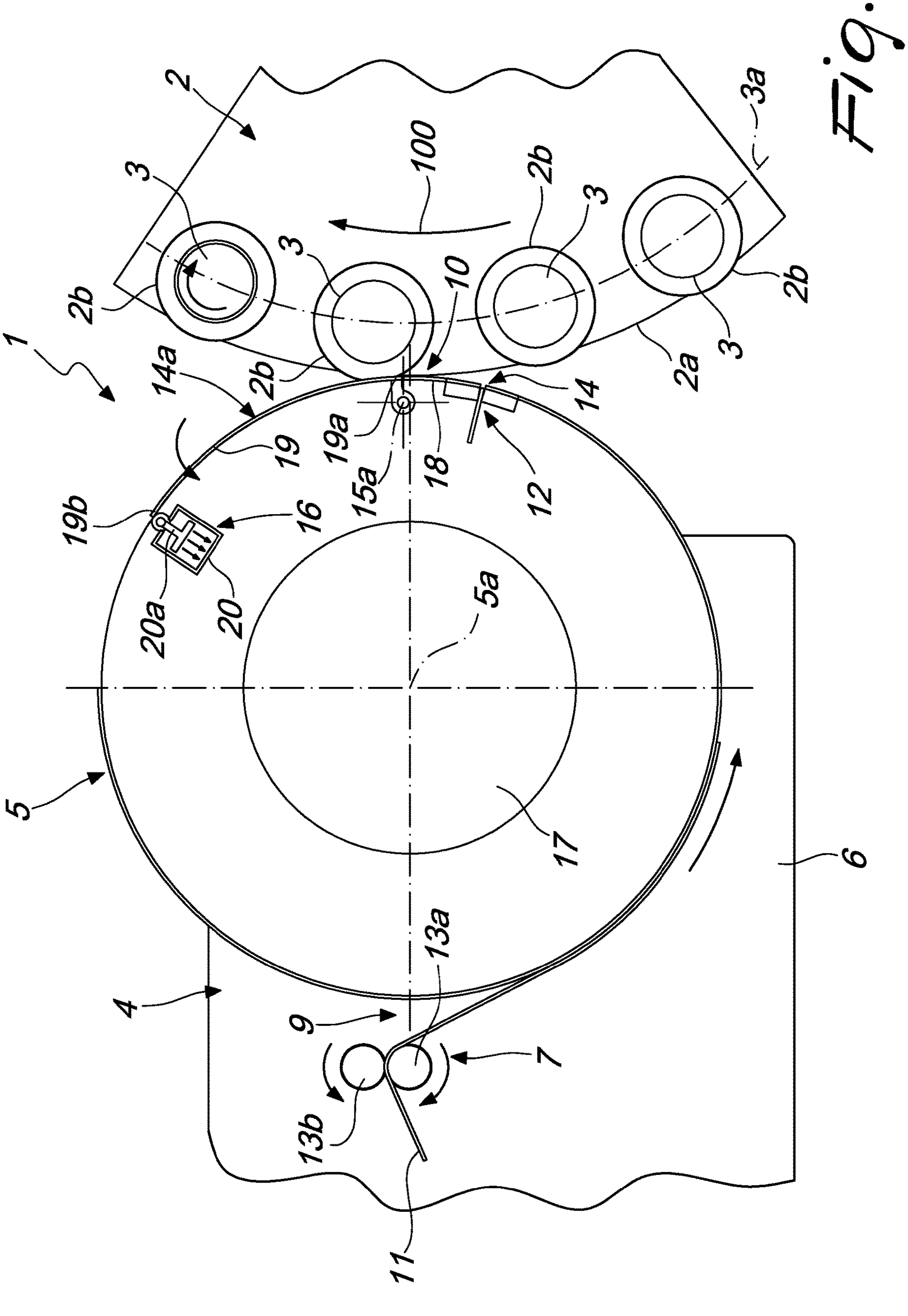
FIG. 3 is a schematic and partially cutaway plan view from above of the machine according to the invention in a step after the step of application of the label by the transfer drum of FIG. 1 to the corresponding container, highlighting the fact that the transfer drum does not come into contact with the container immediately after the one to which it has applied the label.

According to the embodiment of FIGS. 1, 2 and 3, the actuation means 16 comprise a fluid-operated cylinder 20 which acts between the oscillating body 19 and the base structure 17 of the transfer drum 5.

In particular, the fluid-operated cylinder 20 is hinged, with its stein 20*a*, to the end 19*b* of the oscillating body 19.

For example, the fluid-operated cylinder 20 is supplied with its process fluid through one or more connection couplings 26 present on the shell-like body 18 to which the corresponding oscillating body 19 is hinged.

Figure 4:
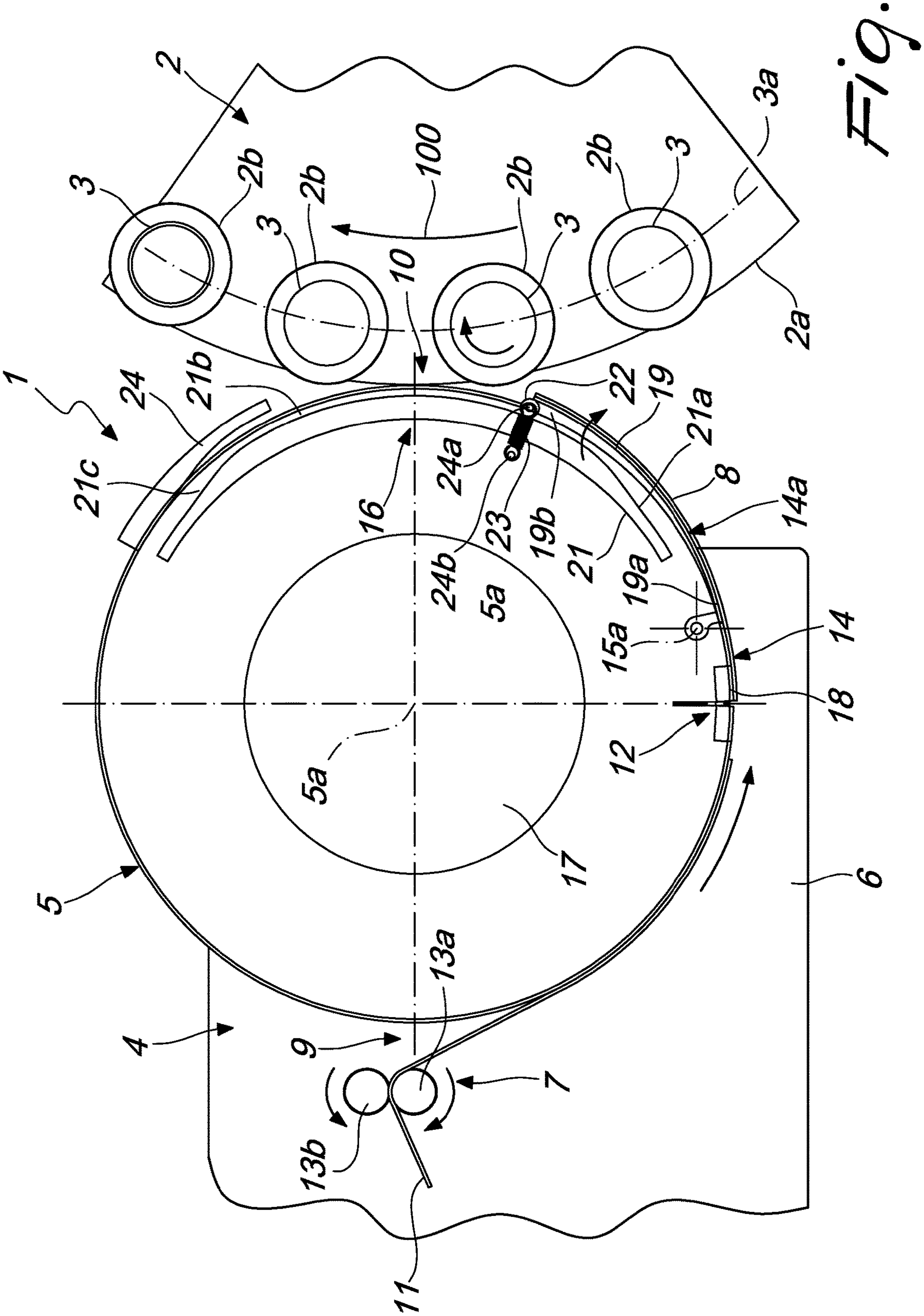
FIGS. 4 to 6 show a sequence of operating steps of a different embodiment of the machine according to the invention, shown in schematic and partially cutaway plan view from above.
Figure 5:
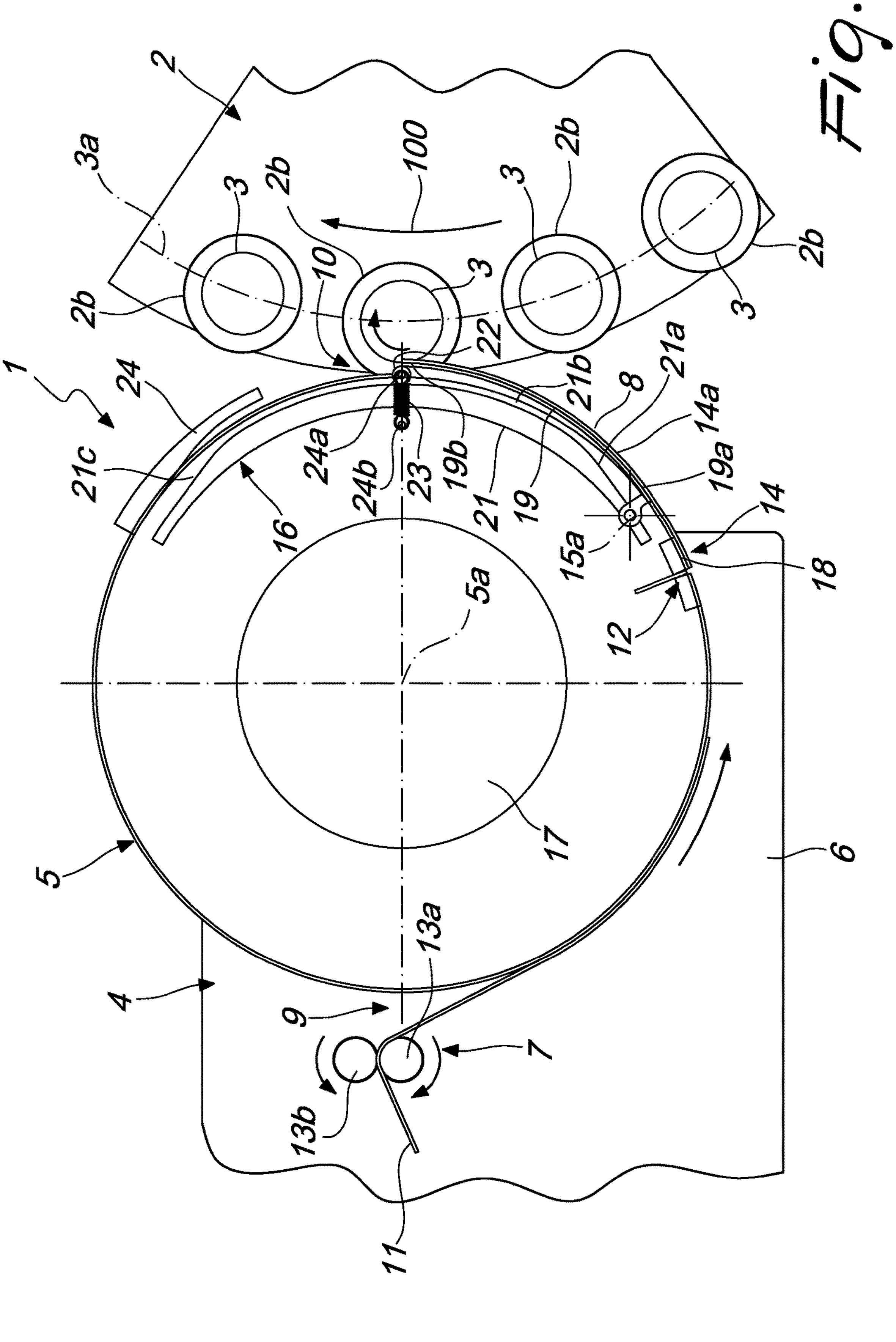
Figure 6:
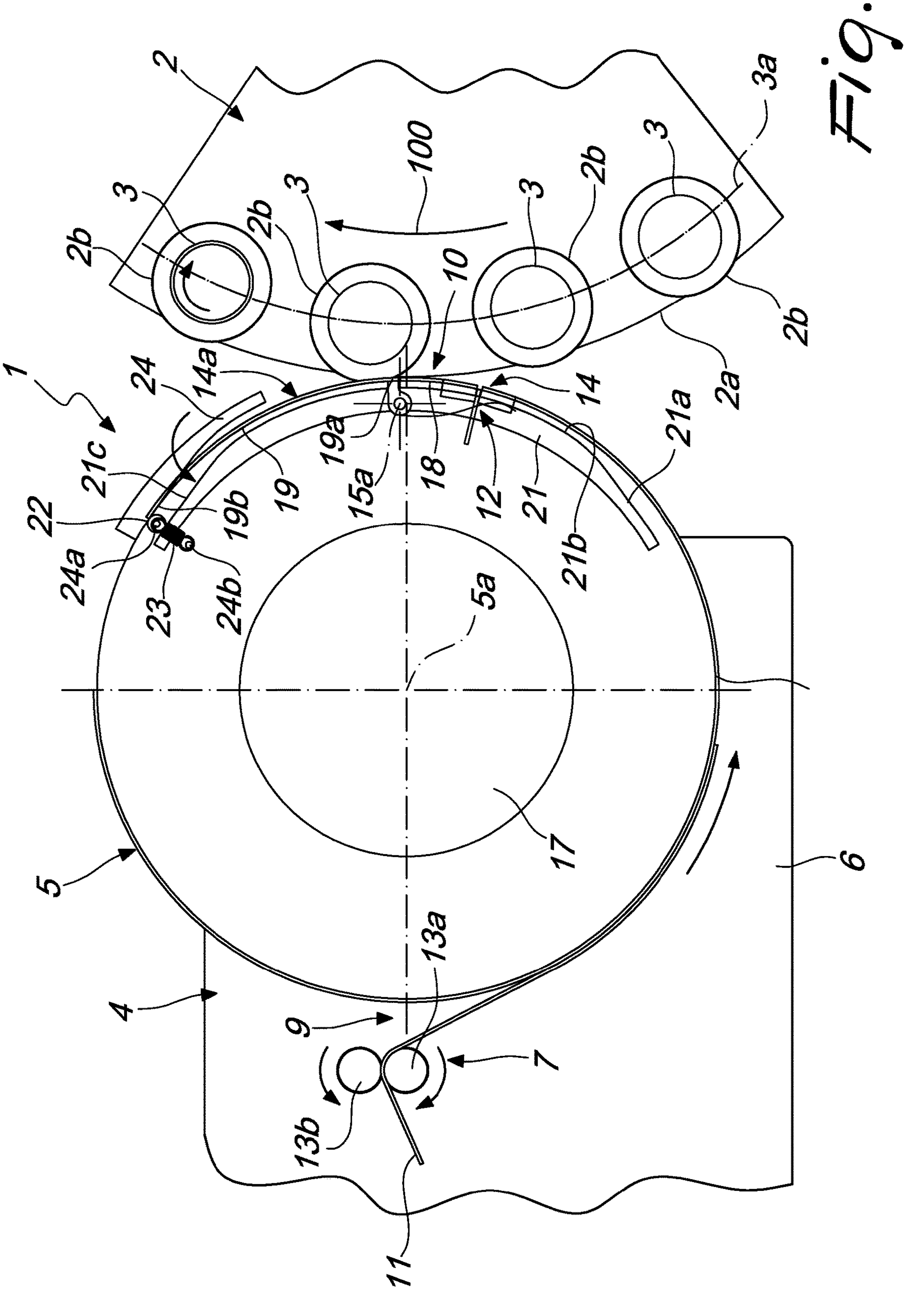

In the embodiment shown in FIGS. 4-6, the actuation means 16 are provided by a cam assembly that comprises a cam-like profile 21, fixed with respect to the supporting base 6, which is arranged conveniently inside the diameter of the transfer drum 5, in a position facing substantially the portion of the lateral surface of the transfer drum 5 that is directed toward the conveyor 2.

In particular, the oscillating body 19 is integrally associated with an abutment element 22 constituted, for example, by a wheel, which acts, in practice, as a tappet of the cam assembly and which slideably engages the cam-like profile 21, during the rotation of the transfer drum 5 about its own axis 5*a*.

Conveniently, there are also elastic means 23 constituted, for example, by a helical spring connected, at one end, to a first engagement element 24*a* that is integral with the abutment element 22 and, at the other end, to a second engagement element 24*b* that rotates integrally with the transfer drum 5, which make it possible to keep the abutment element 22 in contact with the cam-like profile 21.

The cam-like profile 21 is, advantageously, shaped according to a first inclined portion 21*a*, arranged upstream of the transfer station with respect to the direction of rotation of the transfer drum 5, and a portion with a circular arc progression 21*b*, substantially concentric with respect to the lateral surface of the transfer drum 5.

The first inclined portion 21*a* extends progressively farther from the axis 5*a* of the transfer drum 5, proceeding along the direction of rotation of the transfer drum 5, so that the sliding of the abutment element 22 along the first inclined portion 21*a* produces the transition of the oscillating body 19 from the receiving position to the transfer position, while the portion with a circular arc progression 21*b* makes it possible, following its engagement by the abutment element 22, for the oscillating body 19 to be maintained in the transfer position.

Also along the cam-like profile 21, at a certain distance downstream of the transfer station 10, with respect to the direction of rotation of the transfer drum 5, there is a second inclined portion 21*c*, which extends progressively closer to the axis 5*a* of the transfer drum 5, so that, following its engagement by the abutment element 22, the oscillating body 19 can pass, under the action of the elastic means 23, from the transfer position to the receiving position.

Conveniently, substantially at the second inclined portion 21*c*, there can be, outside and in a position directed toward the lateral surface of the transfer drum 5, a counter-cam 24, fixed to the base structure 6, which is slideably engaged by the abutment element 22, so as to cause, in cooperation with the elastic means 23, the transition of the oscillating body 19 from the transfer position to the receiving position.

Figure 7:
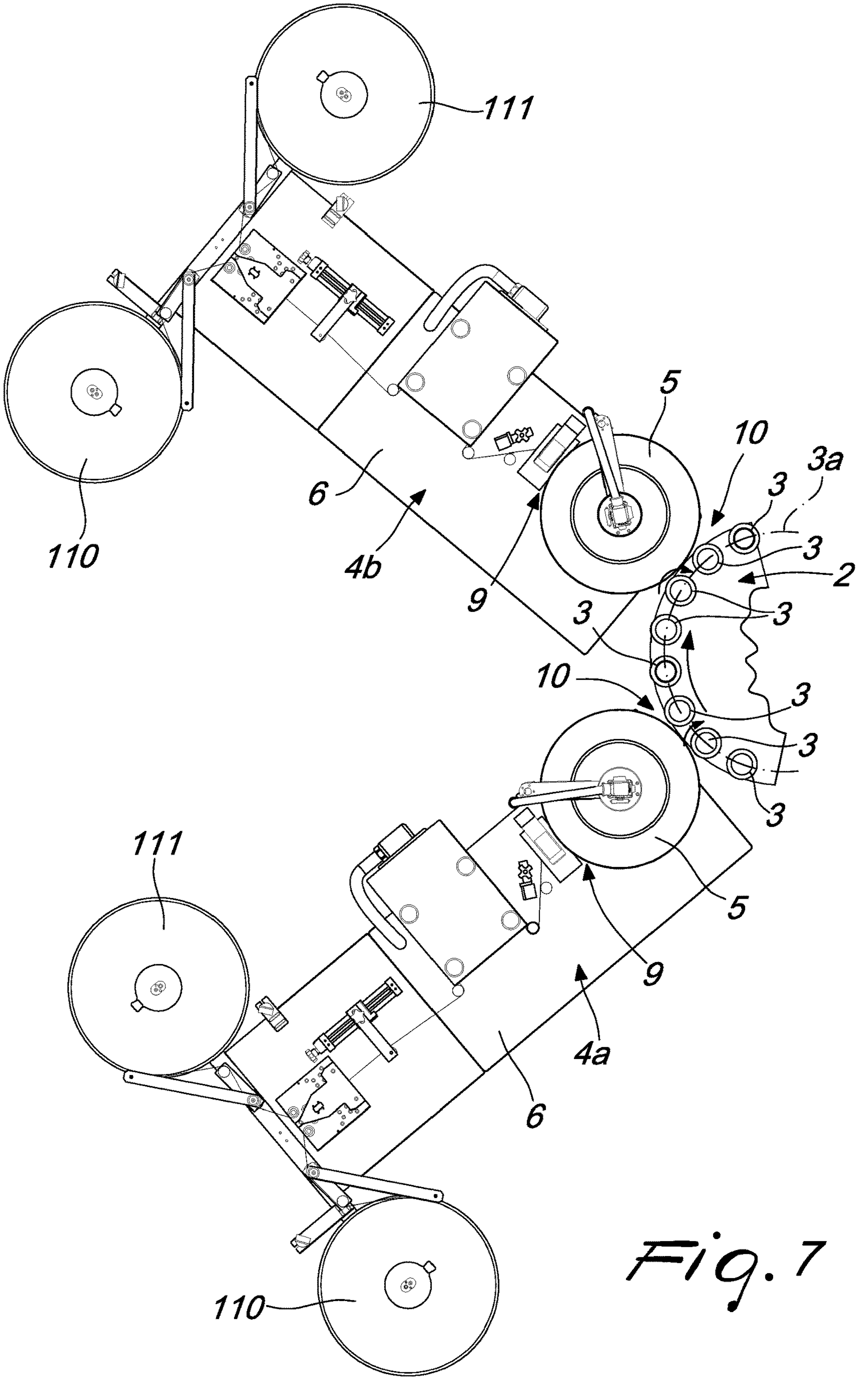
FIG. 7 is a schematic plan view from above of a possible embodiment of the machine according to the invention with at least two labeling units.

It should be noted that, conveniently, as shown schematically in FIG. 7, on the machine at least two labeling units can be arranged along the advancement path 3*a* of the containers 3, which are respectively constituted by at least one first labeling unit 4*a* and by at least one second labeling unit 4*b*, which is arranged downstream of the first labeling unit 4*a* along the direction of advancement of the containers 3 along the advancement path 3*a*, each labeling unit having a respective transfer drum 5 and both labeling units being adapted to apply the labels 8 in tandem to respective containers 3 that arrive from the conveyor 2.

More specifically, the transfer drum 5 of the first labeling unit 4*a* is designed to transfer, at the corresponding transfer station 10, the labels 8 received at the corresponding feeding station 9 to each first container 3 that arrives from the conveyor 5, while the transfer drum 5 of the second labeling unit 4*b* is designed to transfer, at the corresponding transfer station 10, the labels 8 received at the corresponding feeding station 9 to each second container 3 that arrives from the conveyor 2.

Conveniently, the advancement motion of the containers 3 on the conveyor 2 and the rotation of the transfer drums 5 of the labeling units 4*a*, 4*b* are synchronized so that, when the rotatably movable portion 14*a* and, more specifically, the oscillating body 19 of a sector 14 of the transfer drum 5 of one of the labeling units 4*a*, 4*b* reaches the corresponding transfer station 10 with its front end 19*b*, with the oscillating body itself already in the transfer position, so that the head end of its label 8 can come into contact with the surface of a corresponding container 3 to be labeled, the tail portion of the same label 8, which is positioned proximate to the pivot point of the oscillating body 19, is in a position facing, but spaced apart from, the subsequent container 3 in transit on the conveyor 2, destined to be labeled by the other labeling unit 4*a*, 4*b*.

The operation of the machine according to the invention is the following.

The transfer drum 5 of each labeling unit 4*a*, 4*b* receives, at the corresponding feeding station 9, the labeling ribbon 11 from the feeder unit 7 on a sector 14 of its lateral surface, which presents the corresponding oscillating body 19 in the receiving position.

The labeling ribbon 11 is then cut and the label 8 thus obtained continues the movement approaching the transfer station 10, while remaining in adherence to the oscillating body 19 of the corresponding sector 14.

Before the oscillating body 19 with the label 8 adhering to it reaches the transfer station 10, the actuation means 16 cause the transition of the oscillating body 19 from the receiving position to the transfer position.

In this manner, the head of the label 8 adhering to the oscillating body 19 is moved away from the axis 5*a* of the transfer drum 5, and consequently brought near to the container 3 for which it is intended, arriving at the transfer station 10, while its tail remains nearer to the remaining part of the lateral surface of the transfer drum 5, so as to be kept spaced apart from the other containers 3 in transit on the conveyor 2, which are not to be labeled by the corresponding labeling unit 4*a*, 4*b*.

Once the oscillating body 19 has passed the transfer station 10 and in any case before it reaches the feeding station 9 again, the actuation means 16 return the oscillating body 19 from the transfer position to the receiving position, so that it is ready to receive a new label 8 for the next container 3 that the corresponding labeling unit 4*a*, 4*b* is called on to label.

In practice it has been found that the invention fully achieves the intended aim and objects by providing a labeling machine in which variations of the radius of the lateral surface of the transfer drum, i.e. protrusions and recesses thereof, are not fixed on the lateral surface of the transfer drum, as is the case in traditional transfer drums provided with pads on their peripheral region, but are generated by an outward angular movement of at least one portion of the individual sectors or divisions of the transfer drum, which takes place only once the label has been cut and, therefore, after any step of slipping of the labeling ribbon and, in any case, before or just before the application of the label to the corresponding container.

In this manner, the slipping of the labeling ribbon on the transfer drum occurs on a uniform surface and not on a surface characterized by protrusions and recesses.

To this it can be added that, with respect to the known art, the invention makes possible a reduction in the extent of slipping of the labeling ribbon on the lateral surface of the transfer drum thanks to the capacity to increase the number of sectors or divisions along the perimetric extension of the transfer drum.

In fact, the possibility of angular movement of at least some portions of the individual sectors makes it possible to reduce the space between one label and the next in front of the containers transiting on the corresponding conveyor, with respect to the known art.

Another advantage of the invention is that the portion of each sector of the transfer drum that protrudes by oscillating about an oscillation axis distorts the position of the label to a lesser extent than in existing solutions, with consequent improvement of the quality of the final labeling of the containers.

A further important advantage of the invention is that it makes it possible to positively achieve the labeling of the containers even if the spacing, i.e. the distance, between one container and the next on the conveyor is extremely reduced, in that, by virtue of the capacity for angular movement of portions of the sectors of the transfer drum, it is possible to ensure the labels come into contact only with the containers for which they are intended.

Another important advantage of the invention is that it makes it possible to positively carry out labeling even of containers of various shapes, such as, in particular, containers that in transverse cross-section have a shape other than circular, such as, for example, containers that are polygonal or elliptical in cross-section, or, more generally, containers that have a lateral surface that presents variations of its distance from the axis of that container.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102020000000400 from which this application claims priority are incorporated herein by reference.

The invention claimed is:

1. A labeling machine, comprising a conveyor of containers to be labeled along an advancement path and at least one labeling unit arranged along said advancement path and provided with a respective transfer drum that can move in rotation about a drum axis, with respect to a supporting base, and which is adapted to receive, in adhesion to a lateral surface thereof, from a feeder unit, labels to be applied to said containers, at a feeding station, and to transfer the labels received at said feeding station to respective containers that arrive from said conveyor at a transfer station which is angularly spaced apart from said feeding station about the drum axis, on the lateral surface of said transfer drum at least one sector being defined which extends along at least one portion of a circumferential extension of the lateral surface of said transfer drum and is adapted to accommodate, in each instance, a single label to be transferred to a single one of the containers, wherein at least one portion of said at least one sector is rotatably movable, with respect to a remaining part of said transfer drum, about an oscillation axis, which is substantially parallel to the drum axis, in order to pass from a receiving position, in which said at least one portion is arranged at a first angular distance from the drum axis, to a transfer position, in which said at least one portion is arranged, with at least one part thereof, at a second distance, greater than said first distance, from the drum axis, and vice versa;

wherein said transfer drum comprises a base structure that supports at least one shell-like body which defines at least one part of said at least one sector, said at least one portion of said at least one sector comprising an oscillating body, which is hinged with respect to said base structure about said oscillation axis;

wherein said oscillating body is hinged with respect to said base structure substantially at an end of an extension thereof that is arranged at the rear with respect to a direction of rotation of said transfer drum;

wherein said at least one portion of said at least one sector is in said receiving position, at least when the at least one portion passes at said feeding station, during the rotation of said transfer drum about the drum axis;

wherein said at least one portion of said at least one sector is in said transfer position, at least when it passes at said transfer station, during the rotation of said transfer drum about the drum axis.

2. The machine according to claim 1, further comprising actuation means that are adapted to actuate a transition of said at least one portion of said at least one sector between said receiving position and said transfer position.

3. The machine according to claim 2, wherein said actuation means are adapted to bring said at least one portion of said at least one sector from said receiving position to said transfer position, before said at least one rotatably movable portion reaches said transfer station in its movement from said feeding station to said transfer station, during the rotation of said transfer drum.

4. The machine according to claim 2, wherein said actuation means are adapted to bring said at least one rotatably movable portion of said at least one sector from said transfer position to said receiving position, before said at least one rotatably movable portion reaches said feeding station in its movement from said transfer station to said feeding station, during the rotation of said transfer drum about its own axis.

5. The machine according to claim 2, wherein said actuation means comprise a fluid-operated cylinder which acts between said oscillating body and said base structure of said transfer drum.

6. The machine according to claim 2, wherein said actuation means comprise a cam-like profile, which is fixed with respect to said supporting base, said oscillating body having an abutment element which slideably engages said cam-like profile, elastic means being provided which are adapted to keep said abutment element in contact with said cam-like profile.

7. The machine according to claim 1, wherein said oscillating body extends for at least one portion of the circumferential extension of said at least one sector and has an external surface shaped so as to correspond to the remaining part of the lateral surface of said transfer drum.

8. The machine according to claim 1, wherein said oscillating body is arranged, in said receiving position, substantially aligned, with an external surface thereof, to the remaining part of the lateral surface of said transfer drum.

9. The machine according to claim 1, wherein the at least one labeling unit comprises a first labeling unit and a second labeling unit arranged along said advancement path of said containers, the second labeling unit arranged downstream of the first labeling unit along the direction of advancement of the containers along said advancement path, said first and second labeling units each having a respective transfer drum and being adapted to apply the labels in tandem to respective containers that arrive from said conveyor.

10. The machine according to claim 9, wherein the transfer drum of said first labeling unit is designed to transfer, at the corresponding transfer station, the labels received at the corresponding feeding station to each first container that arrives from said conveyor, the transfer drum of said second labeling unit being designed to transfer, at the corresponding transfer station, the labels received at the corresponding feeding station to each second container that arrives from said conveyor.

11. A labeling machine, comprising:

a conveyor for conveying a container to be labeled along an advancement path;

a first labeling unit arranged along said advancement path and provided with a transfer drum that is movable in rotation about a drum axis, with respect to a supporting base, and which is adapted to receive, in adhesion to a lateral surface thereof, from a feeder unit, a label to be applied to said container, at a feeding station, and to transfer the label received at said feeding station to said container that arrives from said conveyor at a transfer station which is angularly spaced apart from said feeding station about the drum axis;

wherein the lateral surface of said transfer drum includes a first sector that extends along at least one portion of a circumferential extension of the lateral surface of said transfer drum and is adapted to accommodate an entirety of a single label to be transferred to the container, wherein at least one portion of the first sector is rotatably movable, with respect to a remaining part of said transfer drum, about an oscillation axis, which is substantially parallel to the drum axis, in order to pass from a receiving position, in which said at least one portion is arranged at a first distance from the drum axis, to a transfer position, in which said at least one portion is arranged at a second distance, greater than said first distance, from the drum axis;

wherein said transfer drum comprises a base structure that supports at least one shell-like body which defines at least one part of said first sector, said at least one portion of said first sector comprising an oscillating body, which is hinged with respect to said base structure about said oscillation axis;

wherein said oscillating body is hinged with respect to said base structure substantially at an end of an extension thereof that is arranged at the rear with respect to a direction of rotation of said transfer drum;

wherein said at least one portion of said first sector is in said receiving position, at least when the at least one portion passes at said feeding station, during the rotation of said transfer drum about the drum axis;

wherein said at least one portion of said first sector is in said transfer position, at least when the at least one portion passes at said transfer station, during the rotation of said transfer drum about the drum axis.

* * * * *